(12) United States Patent
Harris et al.

(10) Patent No.: US 6,766,458 B1
(45) Date of Patent: Jul. 20, 2004

(54) TESTING A COMPUTER SYSTEM

(75) Inventors: Mark Harris, Banbury (GB); Christopher Scott Bolin, Aylesbury (GB); David Emm, Stone (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 826 days.

(21) Appl. No.: 09/678,690

(22) Filed: Oct. 3, 2000

(51) Int. Cl.[7] ............................ G06F 11/30; G06F 12/14
(52) U.S. Cl. ...................... 713/201; 713/188; 713/200; 709/206; 714/26; 714/38
(58) Field of Search ......................... 713/200, 188, 713/201; 709/206; 714/26, 38

(56) References Cited

U.S. PATENT DOCUMENTS

| | | | | |
|---|---|---|---|---|
| 5,974,549 A | * | 10/1999 | Golan | 713/200 |
| 6,070,244 A | * | 5/2000 | Orchier et al. | 713/201 |
| 6,308,272 B1 | * | 10/2001 | Pearce | 713/200 |
| 6,366,912 B1 | * | 4/2002 | Wallent et al. | 707/9 |
| 6,412,070 B1 | * | 6/2002 | Van Dyke et al. | 713/200 |
| 6,584,568 B1 | * | 6/2003 | Dircks et al. | 713/201 |

\* cited by examiner

*Primary Examiner*—Emmanuel L. Moise
(74) *Attorney, Agent, or Firm*—Silicon Valley IP Group, PC; Kevin J. Zilka; Christopher J. Hamaty

(57) ABSTRACT

A computer program for checking user configurable security settings operates as either an on-demand application or a memory resident application. The security checking program may enforce the recommended settings or may generate a report to the user as to where the recommended settings are not in place.

23 Claims, 4 Drawing Sheets

| Parameter | Parameter Testing Code | Recommended Setting |
|---|---|---|
| NORMAL.DOT | Read normal.dot file parameters & compare with Read Only | Read Only |
| ActiveX | Read ActiveX setting from Registry & compare with Signed Only | Signed Only |
| Network file shares | Search all network computers for file shares without passwords & compare with None | None |
| — — — — — | — — — — | — — — — — |

FIG. 2

TESTING A COMPUTER SYSTEM

BACKGROUND OF THE INVENTION

1. Field of the Invention

This invention relates to the field of data processing systems. More particularly, this invention relates to the testing of the configuration of a computer system.

2. Description of the Prior Art

Computer systems typically run many different application programs. Each of these application programs can have a large number of user configurable settings associated with it. This enables users to adapt the operation of the computer programs they are using to suit their personal needs. Such flexibility is highly desirable and is a significant advantage of computer systems.

As computer systems become increasingly critical within the activity of users, problems with the security of the computer systems which render them vulnerable to malicious actions that can interfere with their normal operation become more harmful. As an example, in an office environment it is common for almost the entire work output of a user to involve the use of their computer system and accordingly security problems which allow the malicious interruption of the normal availability of the computer system have a significant economic cost. One example of malicious interference with computer systems is computer viruses that may produce minor abnormal behavior if the virus is relatively benign, but may also produce significant damage in the case of a computer virus that, for example, deletes valuable data.

The ability of users to change configuration settings creates the possibility that such changes may open vulnerabilities in the security of the computer systems concerned. This coupled with the significant economic consequences of computer security breaches renders measures that are able to improve security strongly desirable. Also, as new security threats develop, computer settings may need to be changed from those originally thought to be suitable.

SUMMARY OF THE INVENTION

Viewed from one aspect the present invention provides a method of testing a computer, said method comprising executing a computer program to perform the steps of:

detecting a plurality of user configurable security settings of said computer;

comparing said user configurable security settings with respective recommended security settings; and initiating action to alter any user configurable security settings detected as differing from respective recommended security settings.

Conventional anti-virus computer programs are outward looking and seek to detect harmful computer files as they arrive, whereas the present invention is inward looking in that it seeks to identify configuration settings of a computer system that make it vulnerable to attacks before those attacks occur.

The invention also recognises that individuals seeking to exploit security weaknesses in the security systems of others generally need to rely upon what are the common application programs and computer configurations to give them a starting point for a malicious attack. Exploiting a potential security problem with a very widely used computer program or hardware platform is a very much more common form of malicious attack than seeking to find a security problem with an obscure computer program or hardware platform with very few users. Having recognised that a large proportion of potential security attacks concentrate upon relatively few of the user configurable security settings and application programs of a computer system, the invention provides a computer program tool that examines these user configurable security settings and compares them with recommended security settings in order to initiate potential corrective action. Adopting the recommended security settings for a comparatively manageable number of parameters can dramatically reduce the likelihood of malicious attack on a computer system without degrading the user's ability to configure a computer to suit their own preferences to any significant degree. Many of the parameters that open vulnerabilities to a malicious attack are ones that a user will not care significantly about such that a system that pushes these towards safer settings will be acceptable.

In some embodiments of the invention it is possible for the computer program to initiate corrective action by generating a report of recommended changes to be made with short cuts to enable these changes to be carried out whilst in other embodiments it may be appropriate that the computer program automatically makes such changes in an enforced way without requiring user input.

Whilst the collection of user configurable security settings that may be examined and manipulated by the technique of the present invention is not limited and is advantageously extensible by regular upgrades to the computer program, a preferred set of settings considered by the computer program includes:

an e-mail program setting which automatically runs scripts embedded within e-mails when said e-mails are previewed;

an internet browser version identifier indicating whether or not predetermined security patches are applied;

an internet browser setting indicating selection of a group of parameters associated with operation of said internet browser that corresponded to at least a predetermined level of security;

an internet browser setting indicating that a user is prompted as to whether or not files downloaded via an internet link should be saved;

an application program setting indicating that whether or not any macro associated with a computer file manipulated by said application program is automatically run upon opening said computer file;

an application program setting indicating that whether or not macro security features associated with said application program are activated;

a file setting indicating whether or not a template file for computer files created by an application program is set as a read only file;

a setting indicating whether or not script programs with files manipulated by said computer should be executed;

a setting indicating that a file local to said computer is available for sharing via a network without any user authentication;

a setting indicating that a file upon a network accessible to said computer is available for sharing via said network without any user authentication;

a setting indicating whether or not file type extension are hidden when view computer file names using said computer; and a setting indicating that said computer should attempted to boot from removable disk prior to attempting to boot from fixed disk.

A security checking computer program may be an on-demand computer program run on an occasional basis to produce recommendations or it may be a memory resident computer program that is continuously run to continuously monitor the security sensitive parameters on a computer to ensure that no vulnerabilities are allowed to arise.

Viewed from another aspect the present invention provides apparatus for testing a computer, said apparatus comprising:

detection logic operable to detect a plurality of user configurable security settings of said computer;

comparison logic operable to compare said user configurable security settings with respective recommended security settings; and initiation logic operable to initiate action to alter any user configurable security settings detected as differing from respective recommended security settings.

Viewed from a further aspect the invention provides a computer program product carrying a computer program for controlling a computer to testing a computer, said computer program comprising:

detection code operable to detect a plurality of user configurable security settings of said computer;

comparison code operable to compare said user configurable security settings with respective recommended security settings; and initiation code operable to initiate action to alter any user configurable security settings detected as differing from respective recommended security settings.

Viewed from another aspect the invention also provides a method of protecting a computer system against security problems, said method including the steps of:

downloading data identifying recommended user configurable security settings from a remote source; and updating a set of recommended user configurable security held at said computer system.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is a portion of a list of parameters checked by the computer program, an indication of the testing performed and an indication of the associated recommended settings;

DESCRIPTION OF THE PREFERRED EMBODIMENTS

Figure 1:
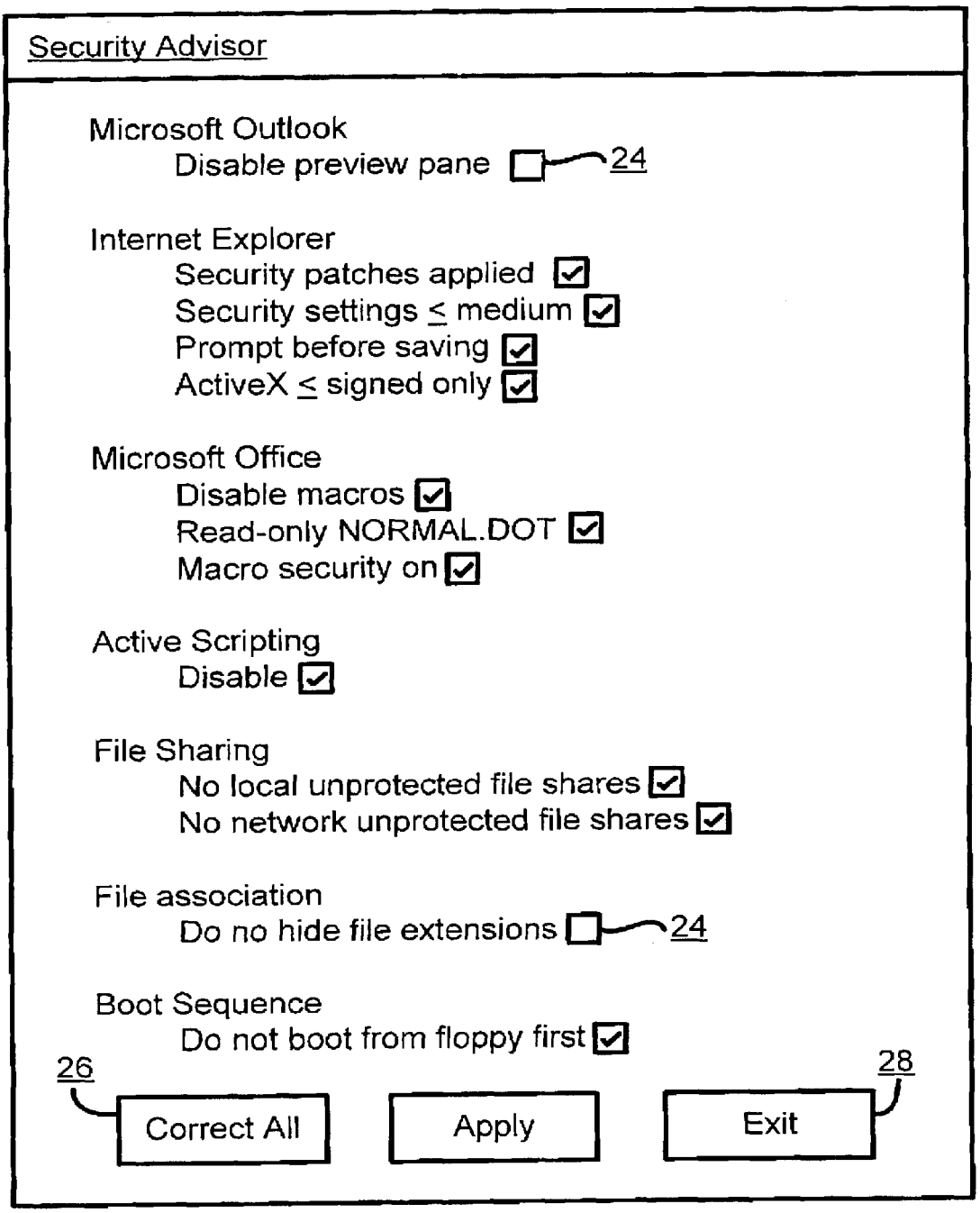
FIG. 1 schematically illustrates a report that may be produced by a computer program monitoring computer system security settings.

FIG. 1 illustrates a report concerning various security parameters examined by a computer program to identify possible security vulnerabilities in the configuration of these user configurable parameters. The list of parameters given in FIG. 1 is an example of common security sensitive parameters, but it will be appreciated that this list may be extended or altered as new computer systems and threats arise. These updated lists may be downloaded, via pull or push systems, from remote source computer via a network such as the internet. The location of the data indicating what settings a particular computer has can vary, although many of the settings will be found in the system registry or in appropriate *.ini files. Program documentation may identify the specific locations, but in some cases the settings locations may be found by manually making a setting change and then identifying the change that occurs, e.g. registry change tracking or an updated *.ini file.

Disabling the preview pane within Microsoft Outlook is recommended as the preview pane will automatically run scripts within received e-mails and these scripts may contain computer viruses or initiate other malicious actions.

The internet explorer browser program has various security options associated with it. An internet browser is a potential source of considerable vulnerability within the security of a computer system. An internet browser typically accesses considerable amounts of data of unverified origin and this may be used by malicious persons to try and disrupt the operation of the computer system accessing that internet information. For this reason, internet browsers typically have associated security patches that are regularly updated and the presence of the most up-to-date security patches may be checked for by the security checking program using a browser version identifier. In addition, there are a considerable number of internet browser settings that may affect security and accordingly browsers typically have grouped sets of settings that may be adjusted together to trade off between the functionality of the browser and its vulnerability to security. The security checking computer program may serve to check that these group settings are set to at least the medium security level. A common activity when accessing information from the internet is to download files. Security is enhanced when the user is prompted before saving such files to their hard disk and accordingly the security checking program ensures that this parameter is set to prompt before saving. Internet web pages now often contain executable portions that may be created by various sources. The internet browser may be configured to only execute such portions if they are signed and authenticated. The security checking program determines that this parameter is set to execute only signed embedded code.

A recently common source of computer virus activity has been based upon the use of macro functionality provided by many application programs. The security checking program may seek to reduce this vulnerability by ensuring that any inbuilt macro security options for an application program are enabled, that the execution of macros is disabled in its entirety or other measures. As a measure to reduce the probability of the propagation of such macro viruses the security checking program may also determine that any application template files are set to read only status. The example in FIG. 1 concerns the widely used Microsoft Office Suite of application programs.

The security checking computer program also reports upon is whether or not active scripting is enabled or disabled. Active scripting can be a source of malicious activity.

The presence of either local or network file shares that are unprotected by user authentication schemes is a vulnerability that enables computer virus propagation to occur more readily. Accordingly, the security checking computer program looks for any unprotected file shares locally present on a computer or accessible to that computer on any network to which that computer is attached.

As is appreciated by many users, certain types of computer file have a higher associated security risk. As an example, executable file types present a greater risk of computer viruses than for example plain text files. In order to assist a user in identifying these higher risk file types, the security checking program ensures that the system is not configured to hide file extension types.

A common hardware vulnerability that may be relatively easily cured without significantly inconveniencing a user is that the boot sequence of a computer be set so as not to first attempt to boot from the floppy disk. Setting the hardware configuration of the computer system to first attempt to boot from an internal disk significantly reduces the threat of boot sector viruses to that computer system.

FIG. 2 schematically illustrates an extensible list of parameters which the security checking program may examine. This list reflects some of the examples given in relation to FIG. 1 and describes the action of the parameter testing code associated with each test together with an indication of the recommended setting that should be adopted.

In a similar way to that in which data indicating newly discovered computer viruses may be distributed to users of anti-virus computer systems as those new viruses are discovered, the technique of the present invention is well suited to the distribution of data identifying further parameters that should be checked by the security checking computer program as vulnerabilities associated with those computer settings come to light or start to be exploited.

Figure 3:
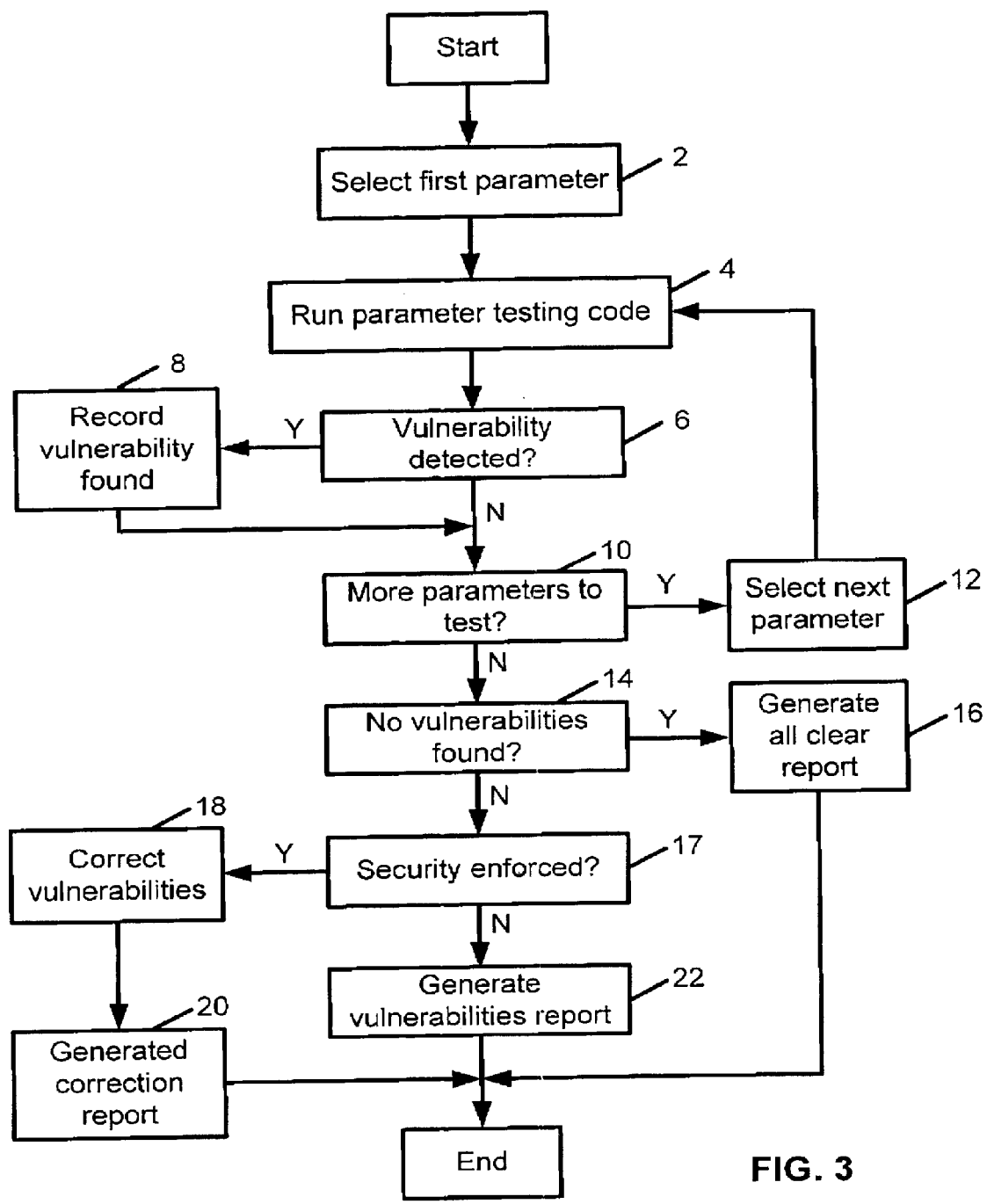
FIG. 3 is a flow diagram illustrating the processing performed by a computer program carrying out security vulnerability checking in accordance with the technique of the present invention.

FIG. 3 is a flow diagram schematically illustrating how the security checking program operates. At step 2, the first parameter within a list of parameters to be checked is selected. At step 4, the testing code that examines that parameter is run. In many cases the parameters concerned may be reflected as registry settings within the system registry. Other settings may require the interaction with an application program concerned or interrogation of low level hardware characteristics, e.g. to examine the boot sequence.

At step 6, a check is made as to whether or not the test of step 4 indicated a vulnerability. If a vulnerability is found, then this is recorded in a list of vulnerabilities at step 8. Step 10 checks as to whether all of the parameters in the list of FIG. 2 have been checked. If there are further parameters to check, then the next of these is selected at step 12 and processing is returned to step 4.

Once all of the parameters within the current list of parameters to be checked have been checked, then processing proceeds to step 14. Step 14 checks as to whether any vulnerabilities were found as recorded within the list compiled by an execution of step 8. If no vulnerabilities were found, then step 16 generates an all clear report.

If vulnerabilities were found, then step 17 checks as to whether security is being enforced on the computer system concerned. Security may be enforced as part of the option settings of a memory resident version of the security checking computer program or as a policy decision in the context of an on-demand security checking computer program. If security is being enforced, then processing proceeds to step 18 at which the parameters which give rise to the vulnerabilities are correct to their recommended settings and step 20 whereby a report regarding the changes that have been made is generated. This report may be displayed to the user and/or sent to a system administrator.

If security is not being enforced, then processing proceeds to step 22 at which a vulnerabilities report is generated. An example of such a report is shown in FIG. 1. The example of FIG. 1 indicates that the two vulnerabilities found by the security checking computer program are that the e-mail previewing pane is enabled and that file extensions are hidden. A user may selectively decide to correct these problems using the security checking computer program by clicking on the appropriate check box 24 and then allowing the security checking computer program to make the appropriate changes in the registry settings or elsewhere. A shortcut "Correct All" button 26 may also be provided together with an "Exit" button 28 by which a user can decide not to correct the vulnerabilities found.

Figure 4:
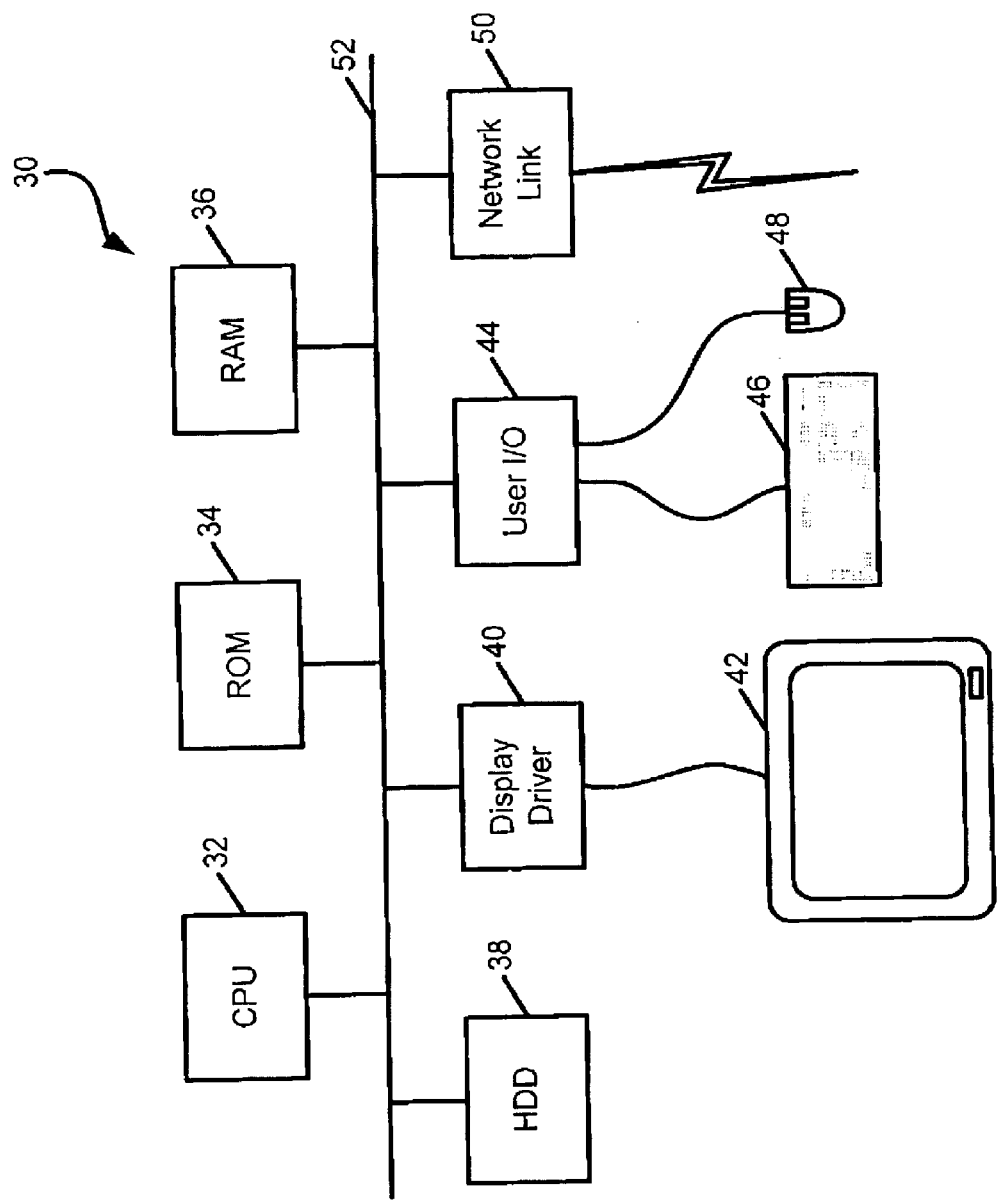
FIG. 4 is a diagram schematically illustrating a general purpose computer of the type suitable for implementing the techniques described above.

FIG. 4 schematically illustrates a general purpose computer 30 that may be used to implement the techniques described above. The general purpose computer 30 includes a central processing unit 32, a read only memory 34, a random access memory 36, a hard disk drive 38, a display driver 40 and display 42, a user input/output unit 44 and keyboard 46 and mouse 48, network link unit 50 and common bus 52. In operation the central processing unit 32 executes computer program instructions forming part of the security checking program in accordance with the above described example. The security checking program may be stored within one or more of the read only memory 34, the random access memory 36 or on the hard disk drive 38. The security checking program may also be downloaded via the network link unit 50 from a remote source together with data and code specifying the settings to be checked. The results of the security checking can be displayed to the user via the display 42 and responses of the user received using the user input/output unit 44. The computer program may be loaded into the general purpose computer 30 using a computer medium such as a compact disk or a floppy disk, alternatively, the computer program may be downloaded via the network link unit 50.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of testing a computer, said method comprising executing a computer program to perform the steps of:

detecting a plurality of user configurable security settings of said computer;

comparing said user configurable security settings with respective recommended security settings; and initiating action to alter any user configurable security settings detected as differing from respective recommended security settings;

wherein said user configurable security settings include at least six (6) of the following:

an e-mail program setting which automatically runs scripts embedded within e-mails when said e-mails are previewed;

an internet browser version identifier indicating whether or not predetermined security patches are applied;

an internet browser setting indicating selection of a group of parameters associated with operation of said internet browser that corresponded to at least a predetermined level of security;

an internet browser setting indicating that a user is prompted as to whether or not files downloaded via an internet link should be saved;

an application program setting indicating that whether or not any macro associated with a computer file manipulated by said application program is automatically run upon opening said computer file;

an application program setting indicating that whether or not a macro security features associated with said application program are activated;

a file setting indicating whether or not a template file for computer files created by an application program is set as a read only file;

a setting indicating whether or not script programs with files manipulated by said computer should be executed;

a setting indicating that a file local to said computer is available for sharing via a network without any user authentication;

a setting indicating that a file upon a network accessible to said computer is available for sharing via said network without any user authentication;

a setting indicating whether or not file type extension are hidden when view computer file names using said computer; and a setting indicating that said computer should attempted to boot from removable disk prior to attempting to boot from fixed disk.

2. A method as claimed in claim 1, wherein said step of initiating comprises generating a recommendation user report specifying recommended changes to be made to said security settings.

3. A method as claimed in claim 2, wherein said recommendation user report includes at least one user input portion via which a user may trigger a user configurable security setting to be altered to a recommended security setting.

4. A method as claimed in claim 2, wherein said computer program is an on-demand computer program run in response to a user input run command.

5. A method as claimed in claim 1, wherein said steps of initiating comprises automatically changing any user configurable security settings detected as differing from respective recommended security settings without user input.

6. A method as claimed in claim 1, wherein said user configurable security settings include each of the following:

an e-mail program setting which automatically runs scripts embedded within e-mails when said e-mails are previewed;

an internet browser version identifier indicating whether or not predetermined security patches are applied;

an internet browser setting indicating selection of a group of parameters associated with operation of said internet browser that corresponded to at least a predetermined level of security;

an internet browser setting indicating that a user is prompted as to whether or not files downloaded via an internet link should be saved;

an application program setting indicating that whether or not any macro associated with a computer file manipulated by said application program is automatically run upon opening said computer file;

an application program setting indicating that whether or not a macro security features associated with said application program are activated;

a file setting indicating whether or not a template file for computer files created by an application program is set as a read only file;

a setting indicating whether or not script programs with files manipulated by said computer should be executed;

a setting indicating that a file local to said computer is available for sharing via a network without any user authentication;

a setting indicating that a file upon a network accessible to said computer is available for sharing via said network without any user authentication;

a setting indicating whether or not file type extension are hidden when view computer file names using said computer; and a setting indicating that said computer should attempted to boot from removable disk prior to attempting to boot from fixed disk.

7. A method as claimed in claim 5, wherein said computer program is a memory resident computer program continuously run as a background task.

8. Apparatus for testing a computer, said apparatus comprising:

detection logic operable to detect a plurality of user configurable security settings of said computer;

comparison logic operable to compare said user configurable security settings with respective recommended security settings; and initiation logic operable to initiate action to alter any user configurable security settings detected as differing from respective recommended security settings;

wherein said user configurable security settings include at least six (6) of the following:

an e-mail program setting which automatically runs scripts embedded within e-mails when said e-mails are previewed;

an internet browser version identifier indicating whether or not predetermined security patches are applied;

an internet browser setting indicating selection of a group of parameters associated with operation of said internet browser that corresponded to at least a predetermined level of security;

an internet browser setting indicating that a user is prompted as to whether or not files downloaded via an internet link should be saved;

an application program setting indicating that whether or not any macro associated with a computer file manipulated by said application program is automatically run upon opening said computer file;

an application program setting indicating that whether or not a macro security features associated with said application program are activated;

a file setting indicating whether or not a template file for computer files created by an application program is set as a read only file;

a setting indicating whether or not script programs with files manipulated by said computer should be executed;

a setting indicating that a file local to said computer is available for sharing via a network without any user authentication;

a setting indicating that a file upon a network accessible to said computer is available for sharing via said network without any user authentication;

a setting indicating whether or not file type extension are hidden when view computer file names using said computer; and a setting indicating that said computer should attempted to boot from removable disk prior to attempting to boot from fixed disk.

9. Apparatus as claimed in claim 8, wherein said initiation logic is operable to generate a recommendation user report specifying recommended changes to be made to said security settings.

10. Apparatus as claimed in claim 9, wherein said recommendation user report includes at least one user input portion via which a user may trigger a user configurable security setting to be altered to a recommended security setting.

11. Apparatus as claimed in claim 9, wherein said detection logic, said comparison logic and said initiation logic are provides using a computer program that is an on-demand computer program run in response to a user input run command.

12. Apparatus as claimed in claim 8, wherein said initiation logic is operable to automatically change any user configurable security settings detected as differing from respective recommended security settings without user input.

13. Apparatus as claimed in claim 8, wherein said user configurable security settings include each of the following:
- an e-mail program setting which automatically runs scripts embedded within e-mails when said e-mails are previewed;
- an internet browser version identifier indicating whether or not predetermined security patches are applied;
- an internet browser setting indicating selection of a group of parameters associated with operation of said internet browser that corresponded to at least a predetermined level of security;
- an internet browser setting indicating that a user is prompted as to whether or not files downloaded via an internet link should be saved;
- an application program setting indicating that whether or not any macro associated with a computer file manipulated by said application program is automatically run upon opening said computer file;
- an application program setting indicating that whether or not macro security features associated with said application program are activated;
- a file setting indicating whether or not a template file for computer files created by an application program is set as a read only file;
- a setting indicating whether or not script programs with files manipulated by said computer should be executed;
- a setting indicating that a file local to said computer is available for sharing via a network without any user authentication;
- a setting indicating that a file upon a network accessible to said computer is available for sharing via said network without any user authentication;
- a setting indicating whether or not file type extension are hidden when view computer file names using said computer; and
- a setting indicating that said computer should attempted to boot from removable disk prior to attempting to boot from fixed disk.

14. Apparatus as claimed in claim 12, wherein said detection logic, said comparison logic and said initiation logic are provides using a computer program that is a memory resident computer program continuously run as a background task.

15. A computer program product carrying a computer program for controlling a computer to testing a computer, said computer program comprising:
- detection code operable to detect a plurality of user configurable security settings of said computer;
- comparison code operable to compare said user configurable security settings with respective recommended security settings; and
- initiation code operable to initiate action to alter any user configurable security settings detected as differing from respective recommended security settings;

wherein said user configurable security settings include at least six (6) of the following:
- an e-mail program setting which automatically runs scripts embedded within e-mails when said e-mails are previewed;
- an internet browser version identifier indicating whether or not predetermined security patches are applied;
- an internet browser setting indicating selection of a group of parameters associated with operation of said internet browser that corresponded to at least a predetermined level of security;
- an internet browser setting indicating that a user is prompted as to whether or not files downloaded via an internet link should be saved;
- an application program setting indicating that whether or not any macro associated with a computer file manipulated by said application program is automatically run upon opening said computer file;
- an application program setting indicating that whether or not a macro security features associated with said application program are activated;
- a file setting indicating whether or not a template file for computer files created by an application program is set as a read only file;
- a setting indicating whether or not script programs with files manipulated by said computer should be executed;
- a setting indicating that a file local to said computer is available for sharing via a network without any user authentication;
- a setting indicating that a file upon a network accessible to said computer is available for sharing via said network without any user authentication;
- a setting indicating whether or not file type extension are hidden when view computer file names using said computer; and
- a setting indicating that said computer should attempted to boot from removable disk prior to attempting to boot from fixed disk.

16. A computer program product as claimed in claim 15, wherein said initiation code is operable to generate a recommendation user report specifying recommended changes to be made to said security settings.

17. A computer program product as claimed in claim 16, wherein said recommendation user report includes at least one user input portion via which a user may trigger a user configurable security setting to be altered to a recommended security setting.

18. A computer program product as claimed in claim 16, wherein said computer program is an on-demand computer program run in response to a user input run command.

19. A computer program product as claimed in claim 15, wherein said initiation code is operable to automatically charge any user configurable security settings detected as differing from respective recommended security settings without user input.

20. A computer program product as claimed in claim 15, wherein said user configurable security settings include each of the following:
- an e-mail program setting which automatically runs scripts embedded within e-mails when said e-mails are previewed,
- an internet browser version identifier indicating whether or not predetermined security patches are applied;

an internet browser setting indicating selection of a group of parameters associated with operation of said internet browser that corresponded to at least a predetermined level of security;

an internet browser setting indicating that a user is prompted as to whether or not files downloaded via an internet link should be saved;

an application program setting indicating that whether or not any macro associated with a computer file manipulated by said application program is automatically ran upon opening said computer file;

an application program setting indicating that whether or not macro security features associated with said application program are activated;

a file setting indicating whether or not a template file for computer files created by an application program is set as a read only file;

a setting indicating whether or not script programs with files manipulated by said computer should be executed;

a setting indicating that a file local to said computer is available for sharing via a network without any user authentication;

a setting indicating that a file upon a network accessible to said computer is available or sharing via said network without any user authentication;

a setting indicating whether on not file type extension are hidden when view computer file names using said computer; and a setting indicating that said computer should attempted to boot from removable disk prior to attempting to boot from fixed disk.

21. A computer program product as claimed in claim 19, wherein said computer program is a memory resident computer program continuously run as a background task.

22. A method of protecting a computer system against security problems, said method of including the steps of:

downloading data identifying recommended user configurable security settings from a remote source; and updating a set of recommended use configurable security held at said computer system;

wherein said recommended user configurable security setting include each of the following:

an e-mail program setting which automatically runs scripts embedded within e-mails when said e-mails are previewed;

an internet browser version identifier indicating whether or not predetermined security patches are applied;

an internet browser setting indicating selection of a group of parameters associated with operation of said internet browser that corresponded to at least a predetermined level of security;

an internet browser setting indicating that a user is prompted as to whether or not files downloaded via an internet link should be saved;

an application program setting indicating that whether or not any macro associated with a computer file manipulated by said application program is automatically run upon opening said computer file;

an application program setting indicating that whether or not macro security features associated with said application program are activated;

a file setting indicating whether or not a template file for computer files created by an application program is set as a read only file;

a setting indicating whether or not script programs with files manipulated by said computer should be executed;

a setting indicating that a file local to said computer is available for sharing via a network authority without any user authentication;

a setting indicating that a file upon a network accessible to said computer is available for sharing via said network without any user authentication;

a setting indicating whether or not file type extension are hidden when view computer file names using said computer; and a setting indicating that said computer should attempted to boot from removable disk prior to attempting to boot from fixed disk.

23. A method as claimed in claim 22, wherein a graphical user interface is provided including a simultaneous listing of each of the configurable security settings, each with an associated check box for changing the configurable security settings.

* * * * *

UNITED STATES PATENT AND TRADEMARK OFFICE
CERTIFICATE OF CORRECTION

PATENT NO. : 6,766,458 B1  Page 1 of 1
APPLICATION NO. : 09/678690
DATED : July 20, 2004
INVENTOR(S) : Harris et al.

It is certified that error appears in the above-identified patent and that said Letters Patent is hereby corrected as shown below:

Col. 11, line 11 change "ran" to --run--;

Signed and Sealed this

Twenty-seventh Day of November, 2007

JON W. DUDAS
*Director of the United States Patent and Trademark Office*